(12) United States Patent
Axelsson et al.

(10) Patent No.: US 8,683,688 B2
(45) Date of Patent: Apr. 1, 2014

(54) METHOD FOR BALANCING A WIND TURBINE

(75) Inventors: Ulf Axelsson, Karlstad (SE); Mikael Bjork, Karlstad (SE); Christian Haag, Karlstad (SE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/321,803

(22) PCT Filed: May 13, 2010

(86) PCT No.: PCT/EP2010/056634
§ 371 (c)(1),
(2), (4) Date: Mar. 29, 2012

(87) PCT Pub. No.: WO2010/133512
PCT Pub. Date: Nov. 25, 2010

(65) Prior Publication Data
US 2012/0180314 A1  Jul. 19, 2012

(30) Foreign Application Priority Data

May 20, 2009  (SE) ...................................... 0950359

(51) Int. Cl.
*F03D 7/00*  (2006.01)
(52) U.S. Cl.
USPC ...................................... 29/889.21; 29/889.3
(58) Field of Classification Search
USPC ..................... 29/889.21, 889.3, 889.2, 889.1, 29/888.021, 402.01, 33 R
See application file for complete search history.

(56) References Cited

U.S. PATENT DOCUMENTS

| 5,584,655 | A | 12/1996 | Deering |
| 7,437,264 | B2 | 10/2008 | Pierce et al. |
| 2008/0111379 | A1* | 5/2008 | Altemark ........................ 290/44 |
| 2008/0247873 | A1 | 10/2008 | Egedal |
| 2009/0021015 | A1 | 1/2009 | Pedersen |
| 2009/0035136 | A1 | 2/2009 | Pierce et al. |
| 2009/0148286 | A1 | 6/2009 | Kammer et al. |
| 2010/0014969 | A1 | 1/2010 | Wilson |

FOREIGN PATENT DOCUMENTS

| EP | 2037119 A1 | 3/2009 |
| WO | 2008041066 A1 | 4/2008 |

OTHER PUBLICATIONS

International Search Report and Written Opinion issued in connection with PCT/EP2010/056634 dated Apr. 27, 2011.

* cited by examiner

*Primary Examiner* — David Bryant
*Assistant Examiner* — Christopher Besler
(74) *Attorney, Agent, or Firm* — Global Patent Operation; Douglas D. Zhang

(57) ABSTRACT

The present invention relates to a method for balancing a wind turbine. The method includes the steps of a) measuring at least one property that is dependent on a motor workload of at least one yaw motor 52 of a soft yaw system 5 during a period of time, b) calculating an unbalance based on the measurement of step a), c) determining a pitch offset angle for at least one turbine blade 41 based on the calculation of step b), and d) changing the pitch of the at least one turbine blade according to the pitch offset angle of step c) for decreasing the unbalance. The present invention also relates to a system for balancing a wind turbine.

13 Claims, 3 Drawing Sheets

METHOD FOR BALANCING A WIND TURBINE

Figure 1:
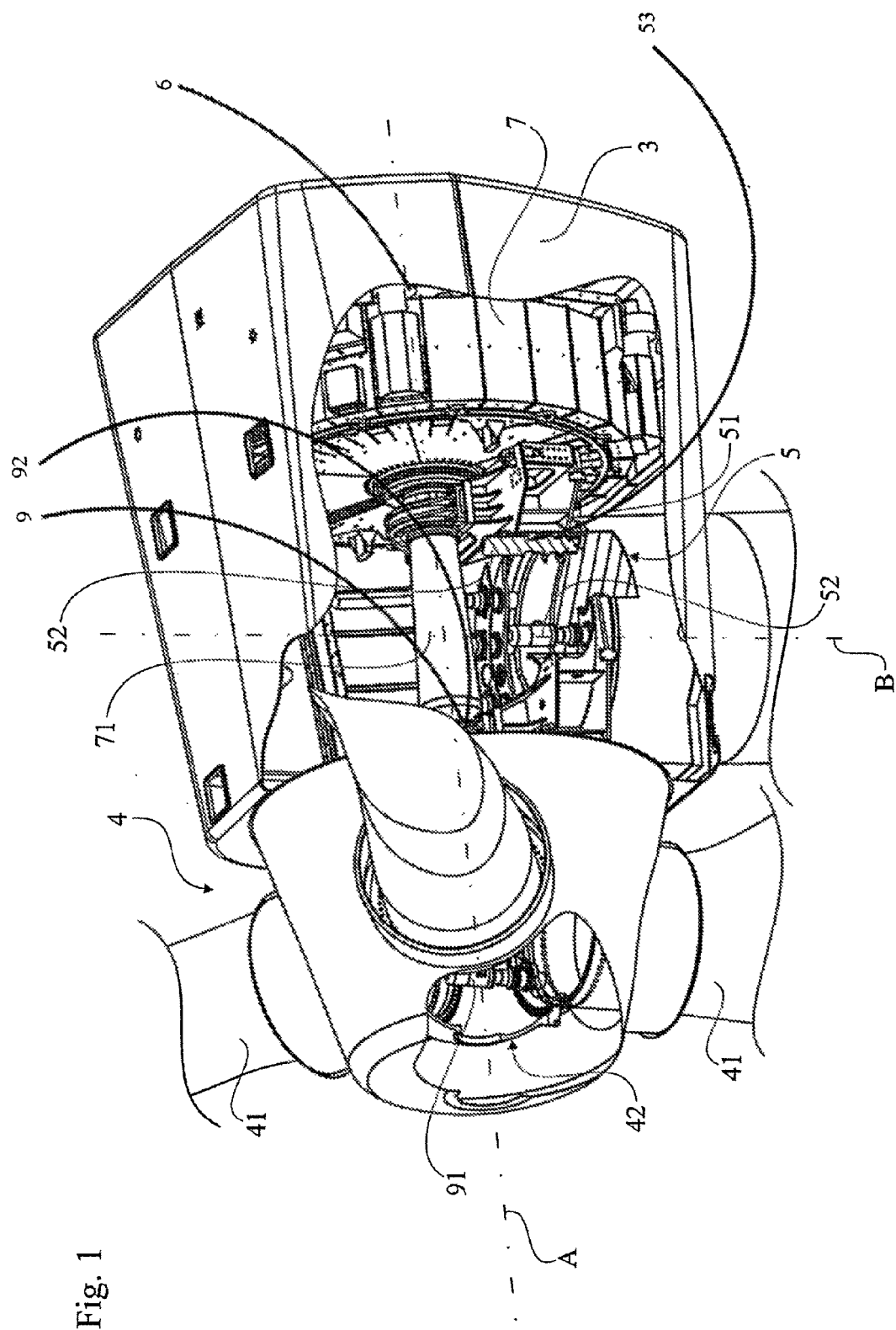

The present invention relates to a method for balancing a wind turbine, the method comprising the step of a) measuring at least one property that is dependent on a motor workload of at least one yaw motor of a soft yaw system during a period of time. The invention also relates to a system for balancing a turbine.

When using a wind turbine with more than one turbine blade for generating electrical energy, it is of great importance that the blades are similar in shape, weight and pitch, since any difference will result in stresses and loads during operation depending on the current angular position of the turbine.

The manufacture and the mounting of turbine blades are therefore sensitive operations. It is, however, important to be able to correct the balance of a turbine after the blades have been mounted, in order to achieve a good operation of the windmill without causing unnecessary stresses or loads to the structure.

An attempt to solve this problem is presented by US 2009/0035136 (Pierce et al.), where a load, an acceleration or a displacement is detected and a pitch offset angle added to one or more of the turbine blades in order to attempt to decrease an unbalance. However, in order to use the method described, several sensors are required and a high precision in the control of unbalances is difficult to achieve. The components also require a high level of maintenance and their level of performance often decrease with time, causing increasing difficulties during the latter stages of the lifespan of the windmill.

There is therefore clearly a need for a more efficient method of eliminating unbalances in a wind turbine.

An object of the present invention is to eliminate or at least to minimize the problems described above. This is achieved through a method for balancing a turbine of a windmill, the method comprising the steps of measuring at least one property that is dependent on a motor workload of at least one yaw motor of a soft yaw system during a period of time, and wherein the method further comprises the steps of calculating an unbalance based on the measurement of step a), determining a pitch offset angle for at least one turbine blade based on the calculation of step b), and changing the pitch of the at least one turbine blade according to the pitch offset angle of step c) for decreasing the unbalance.

Thereby, an unbalance can be detected, analysed and minimised in order to achieve a more efficient and reliable operation of the windmill, while at the same time decreasing the risk for damage to the structure of the windmill due to imbalances.

According to one aspect of the invention, the property is a yaw motor torque. Thereby, the torque needed to counteract forces on the windmill due to the unbalance of the turbine can be identified and analysed, thus enabling a detailed analysis of the unbalance itself.

According to another aspect of the invention, the method also comprises the steps of measuring an angular position of the turbine during the period of time, and using the measurement of step e) together with the measurement of step a) for the calculations of step b).

Thereby, the angular position, for instance in the form of an azimuth angle, can be used for identifying a phase of the unbalance in order to determine which turbine blades pitch offset can be altered to decrease the unbalance.

According to a further aspect of the invention, step b) comprises calculating at least one of: 1) a magnitude or 2) a phase of the unbalance. Thereby, the magnitude and thereby the severity of the unbalance can be determined, or alternatively the section of the turbine that can be the to cause the unbalance. By determining one or more of these factors, the unbalance can be more thoroughly analysed and minimised in a more efficient way.

According to yet another aspect of the invention the steps a)-d) can be repeated until a magnitude of the calculated unbalance is less than 10%, preferably less than 5%, more preferably less than 2% of a maximum yaw torque of the at least one yaw motor. Thereby, the imbalances can be decreased until they are small enough not to hinder the normal operation of the windmill in order for the yaw motor to be able to counteract any external forces in an efficient manner.

According to a further aspect of the invention, a warning process can be initiated if the magnitude of the calculated unbalance is higher than a predetermined value, the value being 20%, preferably 15%, more preferably 10% of the maximum yaw torque. Thereby, an unbalance that is large enough to be a hindrance to the normal operation of the yaw motors can result in a warning process that will alter the operation of the windmill or alert a maintenance staff, or both. Thus the danger of damages to the windmill can be substantially decreased.

According to another aspect of the invention, a balanced state of the turbine can be determined for at least one collective pitch value of the turbine blades. Thereby, the optimal pitch offset for one or a number of different collective pitch values can be determined in order to facilitate the balancing operation after a change in collective pitch value. For collective pitch values that lie between such positions where a balance has been predetermined, a preliminary balance can be calculated by using balance data for such neighbouring positions, for instance through interpolation, and by using such an optimal or preliminary balance as the starting point after altering the collective pitch value, the balancing process needed for achieving a suitable balance at a given time can be substantially facilitated.

Figure 2A:
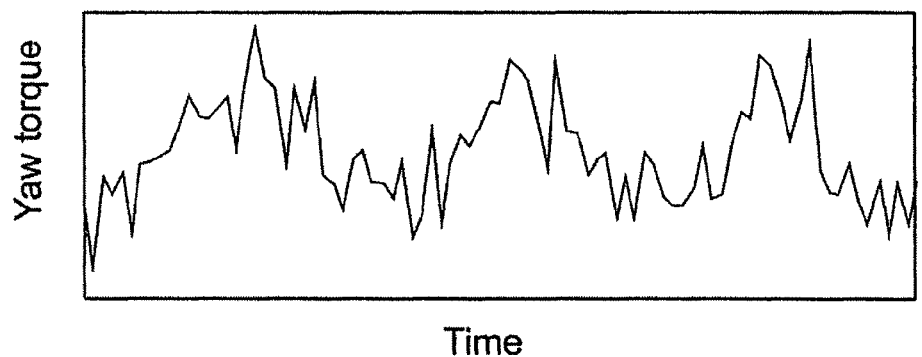
Figure 2B:
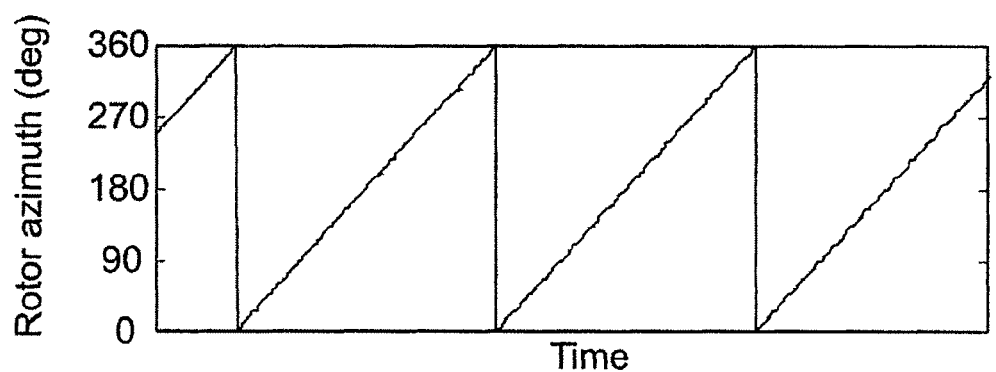
Figure 3:
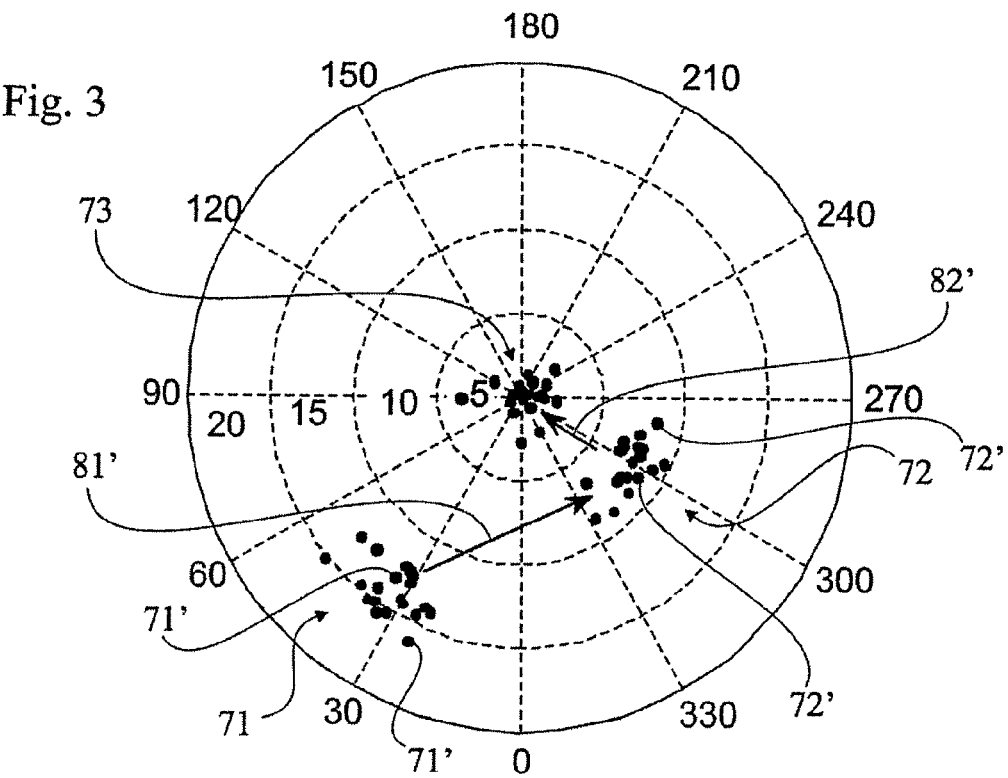
Figure 4:
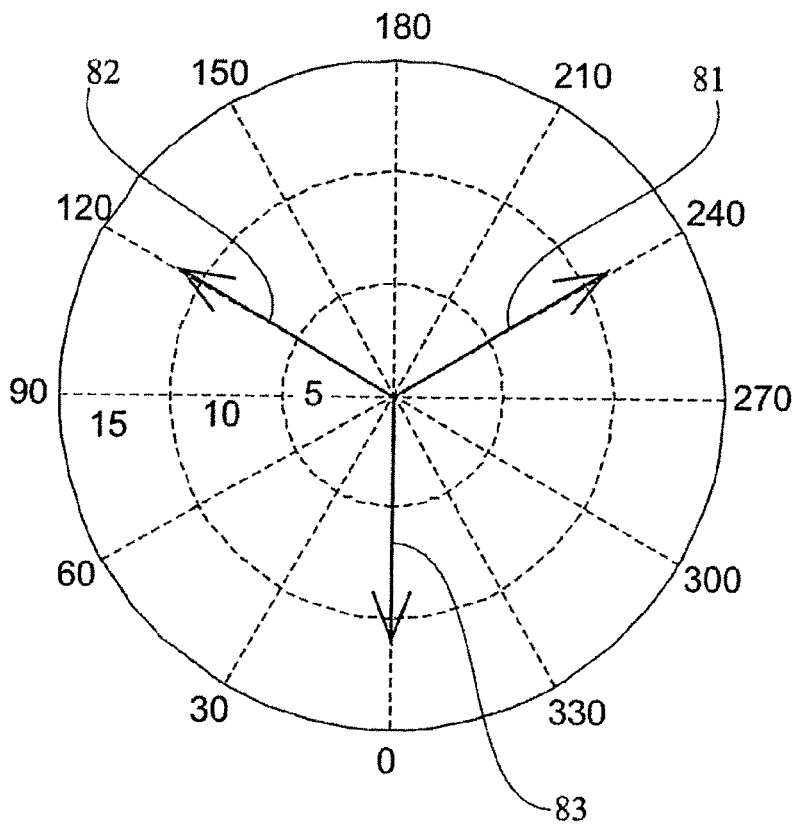

Various aspects and embodiments of the invention will now be described in more detail with reference to the appended drawings, wherein:

FIG. 1 shows a perspective view of a windmill comprising a balancing system according to a preferred embodiment of the invention, FIG. 2a shows an example of a yaw motor torque over a period of time, FIG. 2b shows a turbine angular position during the same period of time as in FIG. 2a, FIG. 3 shows a diagram with clusters of balance points at three different combinations of pitch offset angles, and FIG. 4 shows a diagram with the influence of blade pitch offset on the balance point of a turbine.

FIG. 1 shows a windmill 1 with a balancing system 9 according to a preferred embodiment of the invention, where a tower 2 is joined to a nacelle 3 that houses an electrical power generator 7. The power generator 7 comprises a generator with a shaft 71 that can be made to rotate around an axis A along the length of the nacelle 3, and onto this shaft 71 is mounted a turbine or rotor 4 with a hub 42 where at least one, preferably two or three turbine blades 41, in turn are mounted. When the nacelle 3 is adjusted so that the turbine 4 faces the approximate direction of an oncoming wind, the wind interacting with the turbine blades 41 can cause a rotation of the turbine 4 and result in electrical power being generated by the generator 7 and transferred to a power grid or stored in a suitable storage means (not shown). The balancing system 9 comprises a control unit 92 and pitch control means 91 for changing the pitch of at least one of the turbine blades 41.

Preferably, pitch control means 91 is arranged for changing the pitch of every one of the blades 41 individually. The control unit 92 comprises means for calculating an unbalance as well as means for determining a pitch offset angle for at least one of the turbine blades 41 in order to decrease the unbalance by adding this pitch offset to at least one of the turbine blades 41.

The term turbine used herein is to be interpreted as a hub 42 including at least one blade 41 and designed to rotate around an axis in order to generate an electrical power at a power generator 7 or other suitable device for using the rotational energy thus created. The rotational movement itself is mainly effected through the influence of a wind.

In order for the direction of the turbine 4 to be adjusted, the nacelle 3 can rotate around an axis B that extends along the length of the tower 2, i.e. from the ground and substantially vertically upwards as indicated in FIG. 1. The rotation is effected by a yaw system 5 that is placed at the join between the tower 2 and the nacelle 3, and comprises a yaw bearing 51 that allows a sliding rotary motion of the nacelle 3 around the axis B.

The sliding motion is effected at least in part by at least one, but preferably 2-6 yaw motors 52, mounted on the nacelle 3 and arranged to interact with the yaw bearing 51 of the tower 2 in such a way that the sliding motion can be controlled. The at least one yaw motor 52 can act with a torque M that is smaller than or equal to a maximum torque $M_{max}$ in a clockwise or anti-clockwise direction. The balancing system 9 further comprises means for measuring at least one property of the yaw motor 52 in the form of a yaw torque sensor means 53 is mounted adjacent to the yaw system and is arranged to detect at least one feature of the yaw motor 52, such as the torque M.

Adjacent to the turbine 4, an angular position means 6 is arranged to measure an angular position of the turbine 4, for instance in the form of an azimuth angle of the turbine 4 at any given time. In this embodiment, the azimuth angle is set to 0° when a first of the blades is pointing straight downwards, but this value can also be chosen for any position of the turbine blades 41. By tracking the azimuth angle and detecting the motor torque M used by the yaw system 5 for positioning the nacelle 3 in a way that is suitable for the operation of the windmill 1, any disturbances due to unbalance of the turbine 4 can be detected, as will be described in detail below with reference to FIG. 2-4. The angular position can also be measured in any other form.

The operation of the balancing system will now be described in more detail with reference to the figures.

When operation of the windmill 1 is initiated or resumed after a standstill, or also sometimes during the operation, it is beneficial to analyze the balance of the turbine 4 and perform corrections in order to achieve a better balanced system, if possible. This analysis can be performed online or offline. Both methods will be described below as embodiments of the invention, but other methods of analysis would also be possible to apply within the scope of the claims.

For offline analysis, the azimuth angle φ of the turbine 4 is recorded during a period of time, for instance 30-60 s. During this same interval, the motor torque M applied by the soft yaw system 5 for keeping the turbine 4 in the desired position is also recorded. The magnitude of this motor torque M will be dependent on changes in the strength and direction of the wind, but also on an unbalance to the turbine 4 that would cause a yaw wise rotational force to be applied to the turbine 4 itself. If any property of one or more of the turbine blades 41, such as the pitch, weight or elasticity, for instance, differs from the properties of the other blades 41, this will cause such a force and will also cause the turbine to pick up or drop speed depending on where each individual blade 41 is positioned at any given instant. Therefore, by recording the azimuth angle φ and the applied motor torque M simultaneously, an analysis of such an unbalance can be performed.

The properties of a yaw motor, such as the torque M, can be measured in a number of different ways. For instance, the current that is applied to the yaw motor could be measured and by knowing other yaw motor properties one can arrive at reliable data regarding the applied yaw motor torque M at any given time. The power of the yaw motor 52 could also be used for this measurement, or any other property that is dependent on a workload of the yaw motors 52.

FIG. 2a shows a graph of the applied yaw motor torque M as a function of time, and FIG. 2b shows the azimuth angle φ, also as a function of time. By combining these graphs and analyzing the result in order to remove any disturbances that are non-periodical, i.e. that do not occur each time that the turbine 4 is positioned at the same azimuth angle φ, a non-linear curve fitting can give a representation of the periodic yaw torque M on the form M=A cos(ωt+θ) where A gives an amplitude of the yaw torque M and θ gives a phase. In this equation, w designates the angular velocity of the turbine and t the time.

The resulting amplitude and phase can be illustrated as a balance point in a diagram, such as that shown in FIG. 3, where a magnitude of an unbalance in percentage of the maximum yaw motor torque $M_{max}$ is shown as distance from the centre of the diagram and the phase is shown in the circumferential direction. In the diagram, a cluster 71 comprising a number of such balance points are shown. Each point 71' represents one such non-linear curve fitting based on the recording of motor torque M and azimuth angle φ for a period of time. Thus, after a number of recordings and analyses, the cluster 71 can be created.

In order to minimize the detected unbalance, a pitch offset can be added to one or more of the turbine blades 41, for instance. In FIG. 4, the diagram of FIG. 3 is shown with arrows 81, 82, 83, indicating the direction of change in position of a calculated balance point that would occur if a pitch offset were added to a first, second or third turbine blade 41, respectively. When viewing again the cluster 71 of FIG. 3 and comparing with the directions shown by the arrows 81, 82, 83, it can be seen that an added pitch offset to the first of the turbine blades 41, resulting in a movement in the direction of the arrow 81, would be beneficial in decreasing the unbalance detected in the cluster 71.

After such a pitch offset has been added to the turbine blade 41 designated as the first blade, a new balance analysis can be performed, resulting in a new cluster 72 of balance points 72' placed in the direction corresponding to the arrow 81 of FIG. 4 and indicated by an arrow 81' in FIG. 3. The new cluster 72 is situated closer to the center of the diagram, thereby corresponding to a smaller amplitude A and thereby a decreased unbalance.

Further corrections can be made in order to further minimize the unbalance shown by the cluster 72, such as an added pitch offset to the blade 41 designated as the second blade, and resulting in a new cluster 73 forming in the direction of the arrow 82 of FIG. 4 or 82' of FIG. 3. This cluster is placed in the vicinity of the diagram center, thereby indicating a very small unbalance, if any. An ideal result would be where an amplitude A is close to 0, indicating that the turbine blades 41 act identically and that no unbalance exists. The phase θ is therefore essentially used only to detect which blade to adjust the offset of in order to minimise the amplitude A.

Sometimes a pitch offset can be added to more than one blade 41 at the same time. In the example shown in FIG. 3, a pitch offset added to the first and the second blade 41, it would thus be possible to the cluster 71 to the position of the cluster 73 without reaching the position of the cluster 72. This way, minimizing a detected unbalance can be performed in a time efficient and convenient manner.

It should be noted that the designation of the turbine blades 41 as first, second and third is an arbitrary choice and that the angular values corresponding to the turbine and shown around the edges of the diagram in FIG. 4 can be altered by changing the position that is selected as azimuth angle φ=0°. For a wind turbine 4 with a different number of turbine blades 41 the directions shown by the arrows 81, 82, 83, as well as the number of arrows would be different, but the basic principle for decreasing an unbalance in a turbine 4 would be essentially the same.

The unbalance can also be detected and corrected by an online method, where a fully automated balancing of the turbine can be performed without the need for manual supervision.

According to one method for online analysis of the balance, the angular velocity of the turbine 4 is recorded in order to determine the frequency and an appropriate filter is applied to a recording of the yaw motor torque M, in order to eliminate the majority of disturbances that are not dependant on an unbalance of the turbine. By using this technique, the magnitude (i.e. the amplitude) of the unbalance can be determined with relative ease.

Another online method comprises a cross correlation of the yaw motor torque M with the cosine function of the azimuth angle φ, cos φ, and compare the result with a number of predetermined phases, for instance 12 different phases, in order to determine which phase corresponds best to the actual function cos φ. Through this method, the magnitude of the unbalance as well as the phase involved can be determined and allow for a quick and simple correction of the detected unbalance.

A balancing procedure can be performed automatically at regular intervals, or manually at times when it can be suspected that the balance of the turbine 4 has changed, or both. For instance, at commissioning or after a damaging event such as a lightning stroke or other accident, a balancing procedure might be necessary in order to achieve a desired operation of the windmill 1. It would also be possible to monitor the balance of the turbine 4 continuously and to initiate automatic balancing procedures if the detected unbalance exceeds a predetermined value. Also, an automatic alarm can be set to go off if such an exceedingly large unbalance is detected, and to interrupt the operation of the windmill 1 at such a time. Such an interruption can also be performed in the event that the balancing procedure fails, i.e. if the detected unbalance cannot be decreased by using the procedures or if the individual pitch change calculated to be needed exceeds a predetermined maximum value.

It is important to note that the balance of the turbine blades 41 can differ at different pitch angles, and therefore the balance will shift when a collective pitch value is added to the blades 41, such as when the windmill 1 is set to increase or decrease the angular velocity of the turbine 4. Balancing procedures can therefore be performed every time a collective pitch change has occurred, but in order to avoid the need for this, a balancing program can be performed at some point, for instance during commissioning of the windmill 1, in order to find the desired balance at a number of predetermined collective pitch angles. For instance, the analysis can be performed at a collective pitch of 0°, 5°, 10°, etc. and the balance at any point between these angles can be determined by interpolation, for instance, where a known balance point is used as a starting point for the calculations.

The soft yaw system 5 of the windmill 1 is arranged to continuously apply the necessary yaw motor torque M needed for the nacelle 3 with the turbine 4 to strive towards a position where the operation of the windmill 1 is at its best. The yaw motor torque M can reach its maximum value $M_{max}$ and be directed clockwise as well as anti-clockwise in order to yaw the nacelle 3 in either of these directions, depending on the requirements at the time. If the motor torque $M_{max}$ is not enough to keep the nacelle 3 in the desired position, the nacelle will move softly with the wind until it becomes possible for the yaw motors 52 to rotate the nacelle 3 towards the desired position again.

In order to determine the levels of unbalance for which a correction is necessary, the magnitude of the unbalance can be compared with the maximum torque $M_{max}$ that can be given from the yaw system 5. An unbalance of less than 5% of $M_{max}$ could for instance be considered to be a suitable level for initiating a balancing procedure, if the unbalance is continuously monitored. Similarly, an unbalance of 10% or more can be a suitable level for an alarm signal to indicate that the unbalance is too large, since the operation of the windmill 1 is seriously hindered when the yaw system 5 needs to use a large fraction of the available motor torque M for correcting periodic disturbances in the form of a yaw wise torque that are due to imbalances of the turbine 4.

If a continuous supervision of the balance of the turbine 4 is performed, an automatic controller can be used to continuously perform iterative corrections towards a desired balance. Any change in the collective pitch value or in the other conditions surrounding the windmill 1 might cause the need for improving the balance.

The control unit 92 of the balancing system 9 can also comprise warning means for initiating a warning sequence or process if the unbalance is larger than a predetermined value, for instance 20%, more preferably 15% or even more preferably 10% of the maximum yaw torque $M_{max}$. The operation of the windmill can be interrupted or altered in response to such a detected large unbalance, or if the unbalance detected cannot be decreased by the balancing system, for instance. A warning signal can also be generated in order to alert a maintenance staff to a potential problem at the windmill.

The invention is not to be seen as limited by the preferred embodiments described above, but can be varied within the scope of the appended claims, as will be readily apparent to the person skilled in the art. For instance, the calculations and curve fitting described above can be performed in a number of different ways and the components of the windmill and balancing system can be integrated or designed as well as mounted on the wind turbine in different ways.

Various aspects and embodiments of the present invention are defined by the following numbered clauses:

1. A method for balancing a wind turbine, the method comprising the steps
   a) measuring at least one property that is dependent on a motor workload of at least one yaw motor (52) of a soft yaw system (5) during a period of time,
   b) calculating an unbalance based on the measurement of step a)
   c) determining a pitch offset angle for at least one turbine blade (41) based on the calculation of step b), and
   d) changing the pitch of the at least one turbine blade according to the pitch offset angle of step c) for decreasing the unbalance, and characterised in using the method for determining a balanced state of the turbine for at least one collective pitch value of the turbine blades.
2. A method according to clause 1, characterized in the property being a yaw motor torque.
3. A method according to any preceding clause, characterized in that the method also comprises the step of
e) measuring an angular position of the turbine during the period of time.
4. A method according to any preceding clause, characterized in that the method also comprises the step of
f) using the measurement of step e) together with the measurement of step a) for the calculations of step b).
5. A method according to any preceding clause, characterized in step b) comprising calculating at least one of: 1) a magnitude or 2) a phase of the unbalance.
6. A method according to any preceding clause, characterized in the steps a)-d) being repeated until a magnitude of the calculated unbalance is less than 10%, preferably less than 5%, more preferably less than 2% of a maximum yaw torque of the at least one yaw motor.
7. A method according to any preceding clause, characterized in a warning process being initiated if the magnitude of the calculated unbalance is higher than a predetermined value.
8. A method according to any preceding clause, characterized in the predetermined value being 20%, preferably 15%, more preferably 10% of the maximum yaw torque.
9. A method according to any preceding clause, characterized in a balanced state for a collective pitch value being determined by using data regarding another balanced state as a starting point for calculations.
10. A method according to any preceding clause, characterized in the balanced state being used as a starting position before the method for balancing the turbine is used.
11. A system for balancing a wind turbine, the system comprising:
a turbine with at least two turbine blades,
pitch control means for altering the pitch of the turbine blades,
at least one yaw motor for yawing the turbine against the wind, and
means for determining a pitch offset angle for at least one of the turbine blades for decreasing the unbalance by using the pitch control means, and
characterised in that the system further comprises
means for measuring at least one property that is dependent on a motor workload of the at least one yaw motor,
means for calculating an unbalance based on the measurement of the at least one property,
balancing means that are arranged to determine a balanced state of the turbine for at least one collective pitch value of said turbine blades.
12. A system according to any preceding clause, characterized in the property being a yaw motor torque.
13. A system according to any preceding clause, characterized in that the system also comprises
means for measuring an angular position of the turbine during the period of time.
14. A system according to any preceding clause, characterized in that the means for calculating an unbalance being arranged to also use measurements from the means for measuring an angular position for calculating the unbalance.
15. A system according to any preceding clause, characterized in the means for calculating an unbalance being arranged to calculate at least one of: 1) a magnitude or 2) a phase of the unbalance.
16. A system according to any preceding clause, characterized in the means for calculating an unbalance being arranged to prevent a pitch offset angle being applied to the at least one turbine blade if the magnitude of the unbalance is less than 10%, preferably less than 5%, more preferably less than 2% of a maximum yaw torque of the at least one yaw motor.
17. A system according to any preceding clause, characterized in the system further comprising warning means that is arranged to initiate a warning process if the magnitude of the calculated unbalance is higher than a predetermined value.
18. A system according to any preceding clause, characterized in the predetermined value being 20%, preferably 15%, more preferably 10% of the maximum yaw torque.
19. A system according to any preceding clause, characterized in the balancing means being arranged to determine a balanced state for at least one collective pitch value by using data regarding another balanced state as a starting point for calculations.
20. A system according to any preceding clause, characterized in the balanced state being arranged to be used as a starting position for a collective pitch value of at least two turbine blades before the system for balancing the turbine is used.

The invention claimed is:
1. A method for balancing a wind turbine, the method comprising:
a) measuring at least one property of at least one yaw motor of a soft yaw system during a period of time, the at least one property being dependent on a motor workload of the at least one yaw motor;
b) calculating an unbalance of a rotor of the wind turbine based on the measurement of the at least one property;
c) determining a pitch offset angle for at least one turbine blade based on the calculated unbalance; and
d) changing a pitch of the at least one turbine blade according to the pitch offset angle for decreasing the unbalance.
2. The method according to claim 1, wherein the at least one property is a torque of the at least one yaw motor.
3. The method according to claim 1, further comprising:
f) measuring an azimuth angle of the rotor during the period of time; and
g) using a measurement of the azimuth angle of the rotor together with the measurement of the at least one property for calculating the unbalance.
4. The method according to claim 1, wherein calculating the unbalance comprises calculating at least one of a magnitude and a phase of the unbalance.
5. The method according to claim 1, wherein steps a)-d) are repeated until a magnitude of the calculated unbalance is less than about 10% of a maximum yaw torque of the at least one yaw motor.
6. The method according to claim 1, wherein a warning process is initiated if a magnitude of the calculated unbalance is higher than a predetermined value.
7. The method according to claim 6, wherein the predetermined value is about 20% of a maximum yaw torque of the at least one yaw motor.
8. The method according to claim 1, wherein a balanced state for a collective pitch value is determined by using data regarding another balanced state of the rotor as a starting point for calculation.

9. The method according to claim 1, wherein a balanced state of the rotor is used as a starting position before the method for balancing the wind turbine is used for a changed collective pitch value.

10. The method according to claim 1, wherein the method is used to achieve a balanced state of the rotor after a collective pitch value is added to turbine blades of the wind turbine.

11. The method according to claim 3, wherein the at least one property is a torque of the at least one yaw motor.

12. The method according to claim 3, wherein the at least one property is a current of the at least one yaw motor.

13. The method according to claim 3, wherein the at least one property is a power of the at least one yaw motor.

* * * * *

UNITED STATES PATENT AND TRADEMARK OFFICE
CERTIFICATE OF CORRECTION

PATENT NO. : 8,683,688 B2
APPLICATION NO. : 13/321803
DATED : April 1, 2014
INVENTOR(S) : Axelsson et al.

It is certified that error appears in the above-identified patent and that said Letters Patent is hereby corrected as shown below:

In the Specification

In Column 4, Line 24, delete "w" and insert -- ω --, therefor.

Signed and Sealed this
Twenty-fifth Day of April, 2017

Michelle K. Lee
*Director of the United States Patent and Trademark Office*